Patented Dec. 2, 1930

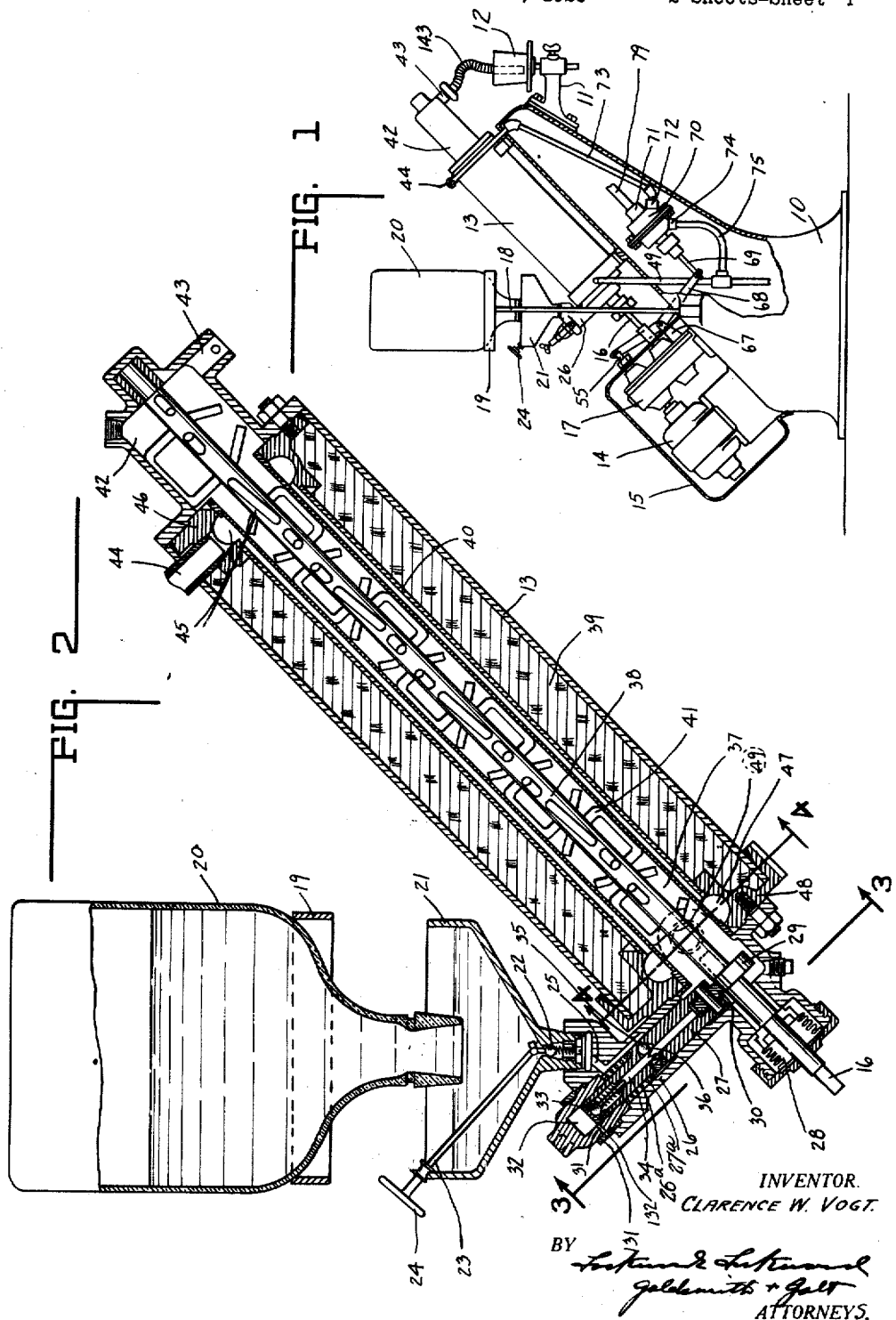

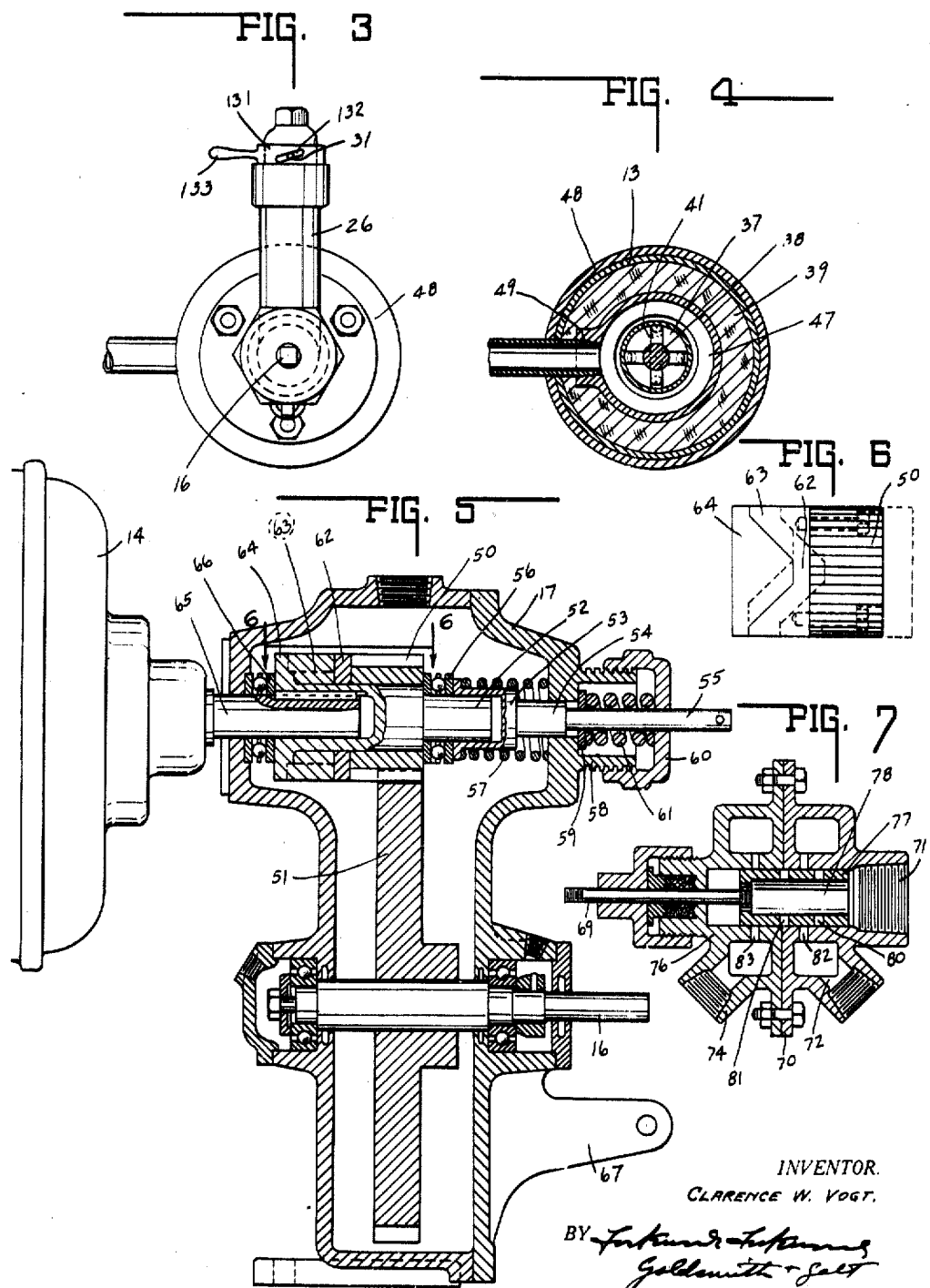

1,783,864

UNITED STATES PATENT OFFICE

CLARENCE W. VOGT, OF LOUISVILLE, KENTUCKY, ASSIGNOR TO VOGT INSTANT FREEZERS, INC., OF LOUISVILLE, KENTUCKY, A CORPORATION OF DELAWARE

APPARATUS AND PROCESS FOR TREATING MATERIALS

Application filed November 1, 1928. Serial No. 316,567.

This invention relates to a process and apparatus, which is particularly adaptable for use in continuously freezing ice cream, sherbet and the like, and also for the processing of vegetable and animal oils, confections, salve and all other materials wherein it may be desirable to alter the temperature, plasticity and/or structure thereof while being agitated or whipped, and is a continuation in part of application Serial No. 242,667, filed December 27, 1927.

The process and apparatus involving the packing of the processed material in containers as disclosed in this application and in said application Serial No. 242,667, are claimed in application Serial No. 491,654, filed Oct. 28, 1930, and the product is claimed in application Serial No. 414,567, filed Dec. 16, 1929.

The principal object of this invention is to provide a machine through which a material or mixture of materials may be continuously passed while being subjected to a temperature change, whipped, agitated, or otherwise processed in an effective, efficient and controllable manner. By means of the invention the process may be carried out at a high rate of speed so that the well known principle of quickly formed crystals being more minute than slowly formed crystals, may be practically utilized in the processing of the many products of a crystalline or partially crystalline nature in which smoothness of texture is an important characteristic. In respect to ice cream, this machine may be conveniently used by injecting the mix under pressure at one end with the proper quantity of fluid, such as air or carbon dioxide, to obtain the desired over-run, and forcing it under pressure while being frozen and whipped, through the cooling or processing chamber.

Where it is desired to employ the machine with respect to the manufacture of substitutes for lard, salves, oleomargarine and the like, or any other materials, it has the advantage of processing such materials at any desired pressure and maintaining at the same time any desired ratio between the quantities of the materials processed, or excluding any one of them entirely if desired.

In processing materials, it is highly advantageous and possible by means of this machine to carry out the process under any desired pressure and at a constant and uniform rate whereby the crystallization or homogenization or chemical action takes place quickly in a uniform state caused by the beating or whipping of the material as it is maintained at or brought to the desired temperature, and thus obtaining a smoother quality of product, eliminating therefrom hard or gritty or non-uniform particles heretofore created by the non-uniformity of the crystallization or other action during the temperature changing process.

The machine is also applicable to the processing of eggs, wherein it is desired to freeze the yolks and whites of the eggs after they are broken. By means of this machine, the eggs are frozen as they are stirred or mixed under greater than atmospheric pressure so that no fluid will be beaten into the product causing deterioration. Almost any single material or combination of materials may likewise be processed with the same or similar advantages.

One feature of the invention as relates to processing of substances or ingredients of a crystalline nature or content, rests in the fact that a greater percentage of the crystals may be permitted to form during the processing, and the product discharged in a stiffer state due to pressure being available to extrude the product thus further processed. This is as distinguished from the usual discharge by gravity. This also enables containers, cups or cones to be filled from the bottom up so as to discharge the air from the top thereof and avoid air pockets being created.

Another feature of the invention resides in pressure feed of the material into the machine at a uniform rate, whereby it may be forced therethrough under greater than atmospheric pressure.

Another feature of the invention is that as a beaten and aerated product leaves the machine, the fluid content expands to or toward atmospheric pressure thereby increasing the total volume of the product, where this is desired.

A further feature of the invention resides in automatically maintaining any desired degree of plasticity, hardness, stiffness or density of the material as it is discharged from the machine.

A still further feature of the invention resides in the material control, whereby the materials may be positively introduced into the machine in any desired quantity ratio for obtaining the desired constant and uniform mixture for processing independently of the actual quantities involved.

A further feature of the invention resides in the provision of a whipping chamber in conjunction with the processing or temperature controlling chamber, wherein the processed or cooled mixture is whipped and agitated without further cooling action so as to cause the fluid, as well as the lesser cooled particles to be whipped into the more thoroughly cooled particles of the material, and, accordingly, cause a smoother and more desirable product to be discharged from the machine.

Another feature of the invention resides in the arrangement of the temperature controlling chamber and the agitating mechanism contained therein, whereby the latter is of a form which is suited to cut or wipe the material from the wall and at the same time whip and mix the material which is being processed. In the usual processing machines this combined function is not present, and there is usually one set of parts used as scrapers or cutters, and provided any agitation is to be obtained, there is provided an additional set of parts of suitable form for agitating. With this feature of the invention the machine produces a product which is more uniform and produces a product at a rate which is uniform due to the mechanism inside of the chamber being rigidly mounted and maintaining a definite maximum thickness of film. Where these scrapers are hinged they do not maintain a uniform thickness of film as they will slide over the film when it becomes hard, and when the film is soft the paddles would scrape against the inside lining of the chamber, thus causing wear and an excess of friction.

One of the most important features resides in the form of the temperature-controlling chamber whereby a relatively larger area of heat transfer surface is presented in proportion to the volume of material under process. This is accomplished by the use of a relatively long and narrow chamber with a central shaft substantially greater in diameter than in the usual form of ice cream freezer. Heretofore, in ice cream freezers the highest surface volume ratio in practical use has been approximately one-half square inch of heat transfer surface for each cubic inch of material volume. However, with the apparatus herein disclosed, excellent results of a commercial nature have been obtained with surface volume ratios greater than one inch of surface to one cubic inch of volume. In the apparatus hereinafter disclosed in detail, the ratio is three square inches of surface to one of volume. The use of a high surface volume ratio means that a relatively thin layer of material is in contact with the heat transfer surface. This enables the entire volume of material passed through the apparatus to be intimately brought into contact with the heat transfer surface and to be thoroughly and uniformly effected thereby. Heat transfer is, therefore, rapid and since rapidly formed crystals are naturally small, the material will have a creamy, smooth texture impossible without this surface volume relation. By eliminating a large amount of useless stirring of a large volume of material, it also reduces the amount of power necessary to operate the machine.

While the drawing and the description show the machine and process as applied to the manufacture of ice cream, it is of course understood that neither the process described hereinabove or hereinafter nor the machine described and illustrated herein are limited to this application, but that this application of the process and machine is merely one example of its many applications. It is obvious that the process and the machine can be used wherever it is desired to treat, process, combine or change the state of any one, or a mixture of more than one, materials continuously while it is necessary or desirable to carry out such process at any desired constant temperature and/or pressure, or wherever it is necessary or desirable to change the temperature of the material or materials while being processed, or where it is desirable or necessary to maintain the materials being processed in an intimately and uniformly mixed or homogeneous state.

The full nature of the invention will be understood from the accompanying drawings and the following description and claims:

Fig. 1 is a side elevation showing the machine. Fig. 2 is an enlarged longitudinal section therethrough. Fig. 3 is a view taken on the line 3—3 of Fig. 2 with parts removed. Fig. 4 is a section taken on the line 4—4 of Fig. 2. Fig. 5 is a central vertical section through the valve control mechanism. Fig. 6 is a plan view of the driving member and pinion. Fig. 7 is a vertical section through the control valve.

In the drawings there is shown a processing machine mounted upon the supporting base 10, having a platform 11 for supporting a cup 12 or any other receptacle for receiving the material or mix discharged from the machine. Mounted upon the base 10 and extending at an angle to the base thereof, there is a tubular cooling or processing barrel 13 having a power drive comprising the motor 14 mounted in the housing 15 and driving the shaft 16 through suitable reduction gears contained in the housing 17.

Mounted upon the support 10, there are supporting bars 18 having a supporting ring 19 mounted thereon in which there may be removably placed in inverted position the jar 20 for containing the mix to be processed. The mouth or discharge end of the jar 20 is adapted to extend into a reservoir 21 so that the mix contained therein remains at a constant level, thus providing a constant head for gravity feed through the ball valve 22 which is controlled by the rod 23 operated by the handle 24.

The reservoir 21 communicates with the valve 22 through the passage 25 in the cylinder 26 in which there is reciprocably mounted a piston 27 driven by means of the shaft 16 passing through the packing glands 28 and upon which there is mounted at the base of the cylinder a cam 29. The lower end of the piston 27 is provided with a roller 30 adapted to engage or ride upon the periphery of the cam 29 for causing said piston to reciprocate within the cylinder 26. A spring 26a seated against a shoulder 27a on the piston 27 serves to return the piston on its downward stroke.

The head of the cylinder is provided with a vent 31 for admitting fluid such as air, carbon dioxide or any other material leading to a chamber 32. The head of the piston is provided with a ball valve 33 for controlling the passage of fluid from the chamber 32 to the passage 34 extending centrally and longitudinally of said piston. The passage 25 for the mix communicates with the passage 35 in the wall of the piston which is controlled by the ball valve 36 for admitting the mix to the central passage 34 extending therethrough. On the up stroke of the piston the fluid is compressed in the chamber 32 and is forced through the ball valve 33 into the passage 34 within the piston. Similarly, the shoulder 27a compresses the mix in the passage 25 and forces it through ball valve 36 into the passage 34. The mix and fluid, are then discharged from the lower end of passage 34 to the lower end of the freezing, processing or temperature changing chamber 37. Said chamber is in the form of an elongated tube through which the shaft 38 extends, said shaft being keyed to the driving shaft 16 so as to be rotated thereby.

The barrel 13 embodies the insulating chamber 39 surrounding the tubular wall 40 of the brine chamber, the tubular wall of the chamber 37 being retained in spaced relation therewith so that the brine surrounds said chamber passing from one end to the other.

After the mix and air, if desired, are pumped by the action of the piston 27 into the bottom of the freezing chamber 37, they are forced upwardly at an incline therein and continuously agitated and whipped by the action of the whipping blades 41 mounted on the rotating shaft 38. As the fluid and mix are whipped together and forced upwardly in said processing chamber, the mix is gradually cooled or frozen by the low temperature of the chamber 37 and the wall thereof produced through the medium of the brine surrounding the same. Since a certain pressure is required to advance the frozen material through the chamber and since the action of the piston 27 is capable of forcing the mix and air into the processing chamber at a pressure high enough to so advance the material, it is evident that the processing in the chamber is carried out under pressure greater than atmosphere.

For positively forcing the material through the processing chamber or causing it to flow in the thin confined layer, screw mechanisms of the types heretofore proposed have not been found satisfactory if the material is undergoing a change from a liquid to or toward a plastic state, or if crystallization is taking place. The screw becomes clogged so that the material travels around with the screw rather than being forced axially by it.

In my invention, a more advantageous means is employed which exerts pressure on the supply at or before the point of entry of the material to the chamber or confined space. The mix is cooled or frozen to the desired plasticity when it reaches the end of the chamber 37 and is discharged into the whipping chamber 42, where it is whipped without further cooling or freezing action, since said chamber is not surrounded or cooled by the brine. It is a well known fact that there is a greater rate of heat exchange between two metal surfaces than between a metal and the atmosphere, wherefore the outside surface of the whipping chamber is or may be maintained at a relatively cooled temperature as the heat absorption of this surface from the air is approximately balanced by the heat flow therefrom to the processing barrel to which it is attached. This action in the whipping chamber serves to more uniformly incorporate the particles of mix of greater and lesser hardened condition so as to produce a smoother product. Thereupon, said product is forced through the nozzle 43 into any suitable container 12, such as a can, cup or mold. The pressure feed of the freezer as distinguished from the usual gravity feed, enables a container to be filled from the bottom up by connecting a flexible tube 143 to the nozzle 43, whereby the operator may project the end thereof near the bottom of the container and withdraw the same as the container is filled. Thus the air is forced from the top of the container which eliminates formation of air pockets caused by filling the container from the top. This is particularly desirable in filling molds.

For the purpose of controlling the fluid supply through the vent 31, a rotatable valve in the form of a collar 131 is mounted about the cylinder 26, said collar is provided with an elongated slot 132 disposed at an angle so as to vary the area of the vent by the rotation of the valve collar through the medium of the operating handle 133. Thus the fluid may be entirely shut off when not desired, owing to the nature of the material being processed.

It will be noted that the blades 41 are in the nature of heavy wire U-shaped staples extending through suitable apertures in the shaft 38 and secured therein, the heads of the staples acting as paddles. The blades are positioned so as to approach the wall very closely but are free from actual engagement therewith, thus preventing undue wear upon the surface and, at the same time, preventing a film from accumulating upon the wall, in addition to the whipping action given the mix while passing therethrough.

The brine is introduced through the pipe 44 to the annular recess 45 in the end fitting 46 so as to surround the processing chamber and pass about the wall thereof to the annular chamber 47 and the lower fitting 48, from whence it is discharged through the passage 49.

The brine is controlled by the condition of the mix as to its hardness or plasticity while passing through the processing and whipping chambers. By the control mechanism, which will hereinafter be described, the resistance of the material to the rotation of the shaft 38 and blades 41 actuates the mechanism to reduce the valve controlled passage of the brine and decrease the hardness to which the mix is processed thereby. On the other hand, a full flow of brine will pass around the processing chamber and process the mix to a relatively harder state upon the condition of the mix being softer and exerting less resistance. Thus the brine is controlled and thereby the hardness of the mix is directly effected through the condition thereof. The mechanism may be regulated so as to cause the mix to be processed to the desired degree of hardness within certain limits. Furthermore, the control mechanism acts to open and close the brine control valve upon the starting or stopping of the driving motor.

The mechanism just referred to comprises the pinion 50 adapted to mesh with and drive the gear 51 which is keyed to the shaft 16, mounted in the gear box 17. The pinion 50 is mounted on a stub shaft 52 rotatably mounted in the socket 53 formed with a projection 54 having a reduced rod 55 extending therefrom and slidably mounted in the housing 17.

A thrust bearing 56 is positioned between the pinion 50 and the socket 53. Between the enlarged flange portion of the socket 53 and the inner surface of the housing, there is a light compression spring 57. Mounted on the rod 55 and within the well 58 formed on the housing 17, there is a washer 59. Between said washer and the adjusting nut 60, which screws on to the well 58, there is a relatively heavy compression spring 61.

On the opposite side of the pinion 50 there is formed an extension 62 provided with oppositely-extending V-shaped projections 63 forming a V-shaped pocket into which the driving member 64 extends, as best illustrated in Fig. 6. The driving member 64 is keyed to the stub shaft 65 of the motor having its bearing in the housing 17, and is separated from the side wall of the housing by the thrust bearing 66.

Fulcrumed on the projection 67, extending outwardly from the housing 17, there is a lever 68 (shown in Fig. 1), the upper end of said lever is connected with the end of the rod 55 and the lower end thereof is connected with the rod 69. The rod 69 operates the brine control valve (illustrated in Fig. 7 and shown in position in Fig. 1). Said valve is provided with an intake nipple 71 and a discharge nipple 72 connected with the brine tube 73 leading to the brine inlet 44. The by-pass nipple 74 connects with the by-pass brine tube 75 which connects with the discharge brine tube 49.

Said valve comprises a cylinder 76 in which the piston 77 is reciprocated through the action of the rod 69 to which it is connected. Said cylinder is provided with a chamber 78 into which the brine passes from the supply pipe 79 through the intake nipple 71, and is provided with the ports 80 and 81 adapted to register with the ports 82 and 83 respectively, whereby the brine entering the piston will pass through the ports 80 and 82 when they are brought into registry and through the pipe 73 to the processing chamber. The movement of the piston will vary the registry of the ports 80 and 82 so as to vary the amount of brine passing therethrough. When the ports 81 and 83 register, the brine passes through the by-pass tube 75 and returns to its source.

The operation of the control valve will now be described:

When the motor is not in operation, the brine will be shut off by reason of the piston 77 (shown in Fig. 7), when the ports are out of registry. Thus no brine will flow through the machine. This is brought about by the action of the compression spring 61 exerting pressure upon the rod 55 which acts upon the piston through the lever 68. When it is desired to process the mix and the current is turned on to rotate the motor for driving member 64, the driving mechanism rotating the shaft 38 will be driven through the pinion 50. The resistance of this mechanism will cause the driving member 64 to vary its position with respect to the driven pinion 50 whereby said pinion will be forced forwardly to a position substantially as illustrated by dotted lines in Fig. 6, by reason of the member 64 sliding up the inclined sides of the corresponding V-shaped recesses formed by the projection 63. The spring 57 is sufficiently weak to permit compression thereof by reason of the unloaded resistance to the motor, sufficiently to pull the piston 77 forward until the ports 80 and 82 register. Brine is then discharged to the processing chamber substantially simultaneously with the driving of the pumping piston 27 for forcing the mix and air therethrough. Upon the mix becoming cooled stiff, such as to create further resistance to the motor, the member 64 and the projections of the pinion 50 will further slide and separate against the tension of the heavier spring 61. This will cause a further movement of the lever 68 and piston 77 so that the ports 80 and 82 will be moved slightly off center with respect to each other and thereby reduce the amount of brine passing therethrough.

The reduction of the amount of brine will reduce the stiffness to which the mix is cooled and thereby reverse the operation so that the ports again will be in complete registry with each other and permit a full amount of brine to pass into the machine. At such times as the mix reaches its maximum stiffness and exerts a maximum pressure on the spring 61, the movement of the piston will be sufficient to cause the ports 80 and 82 to completely move out of registry with each other and cause the by-pass ports 81 and 83 to register so that the brine will by-pass through the valve back to the source. It will be observed that the ports are so arranged as to permit a continuous flow of brine through the valve, the flow being divided between the ports 80 and 82 and the ports 81 and 83 when the valve is not shut off or when one set of ports is in complete registry.

By reason of the above mechanism and its operation, the hardness or plasticity of the mix may be maintained substantially constant. For varying the plasticity or hardness, the operator may adjust the nut 60 to increase or decrease the tension of the spring 61 so that a greater or lesser degree of stiffness or hardness of the mix will compress the same and will thereby actuate the control valve 70 as above described.

Attention is further called to the fact that the whipping chamber 42, which may be of any suitable capacity for producing the best results, wherein any air bubbles incorporated in the cooled mix will be reduced in size and increased in number, is of relatively larger diameter than the processing chamber so that the whipping blades therein will rotate at greater speed than the whipping blades of lesser length in the processing chamber. Thus the speed of whipping the mix while in the processing chamber is less than in the whipping chamber. This is a very important feature of the machine as the speed of whipping should be greater after the mix is cooled than while being cooled to obtain a finer texture and good volume. In this connection, it may further be noted that the whipping blades 41 both in the processing chamber and in the whipping chamber are rigid rather than loosely mounted so as to flop, as is customary. Thus, there is a positive whipping action which breaks up any lumps, as distinguished from the loosely mounted blades which will pass over or by any lumpy or similar obstruction. Whereas the invention has been described particularly as relating to cooled substances, it is equally applicable to substances which require heating during the processing instead of cooling.

The invention claimed is:

1. The process of treating material consisting in positively forcing a continuous stream thereof through a processing chamber, varying the temperature of the material while passing therethrough, whipping the material during its passage, and thereafter further whipping the treated material in another chamber without substantial variation in temperature.

2. The process of treating a material consisting in positively forcing a continuous stream thereof and a fluid through a processing chamber, varying the temperature of the material while passing therethrough, whipping the fluid into the material during its passage through said chamber, discharging the treated material from the other end of the processing chamber, and further whipping the treated material in another chamber without substantial variation in temperature.

3. The process of treating a material consisting in continuously passing the same through a processing chamber, mixing therewith a gaseous fluid, agitating said material and fluid so as to cause the fluid to be enveloped in the said material, maintaining said material and fluid under greater than atmospheric pressure during the mixing thereof, and discharging the treated material at atmospheric pressure whereby the fluid mixed with the material will expand to larger volume.

4. The process of treating a material consisting in passing a continuous stream thereof through a processing chamber maintained at a relatively low temperature by a cooling medium, and passing the cooled material from said chamber into a whipping chamber and whipping it therein without further appreciable cooling thereof for thoroughly mixing the greater and lesser cooled particles with each other.

5. A method of processing material including continuously passing a stream of material through a processing chamber, altering the temperature thereof during said passage, positively forcing a quantity of fluid into said material before the temperature thereof has become substantially changed, and adjustably controlling the quantity of said fluid to maintain a desired quantity ratio between said material and said fluid.

6. A method of treating material including the continuous passage of a stream of said material through a processing chamber, associating a medium therewith for changing the state of the material, and automatically controlling said medium responsive to the physical condition of the material in process.

7. A method of treating material including the continuous passage of a stream of said material through a processing chamber, associating a medium therewith for changing the state of said material, automatically stopping the supply of said medium when the material under process has reached a predetermined physical condition and automatically reestablishing said supply when said material departs from said predetermined physical condition.

8. A method of treating material including the continuous passage of a stream of said material through a processing chamber, the association of a medium therewith for changing the state of said material, the mechanical agitation of said material, and the automatic and continuous control of said medium responsive to the torque required for said agitation.

9. A method of treating material including the continuous passage of a stream of said material through a processing chamber, the association of a medium therewith for changing the temperature of said material, the mechanical agitation of said material, and the automatic stopping and starting of supply of said medium dependent upon the torque required for such agitation.

10. A method of treating material including the continuous passage of a stream of said material through a processing chamber, the association of a medium therewith for changing the temperature of said material, the mechanical agitation of said material, the automatic stoppage of supply of said medium when the torque required to agitate said material is greater than a predetermined value and the automatic reestablishment of said supply when said torque is less than said predetermined value.

11. The process of treating a material consisting in continuously passing a stream of said material into and out of a temperature-changing chamber, associating a temperature-changing medium with said chamber, and continuously controlling the effect of said medium by the physical condition of the material passing through said chamber.

12. The process of treating a material consisting in continuously passing a stream of said material through a temperature-changing chamber, associating a temperature-changing medium with said chamber, and automatically and continuously controlling said medium in accordance with the plasticity of the treated material.

13. A method of treating material including the continuous passage of a stream of said material through a processing chamber, the association of a medium therewith for changing the temperature of said material, the mechanical agitation of said material and the automatic and continuous control of said medium responsive to the torque required for said agitation.

14. A method of treating material including the continuous passage of a stream of said material through a processing chamber, the association of a medium therewith for changing the temperature of said material, the mechanical agitation of said material, and the automatic stopping and starting of supply of said medium dependent upon the torque required for such agitation.

15. A method of treating material including the continuous passage of a stream of said material through a processing chamber, the association of a medium therewith for changing the temperature of said material, the mechanical agitation of said material, the automatic stoppage of supply of said medium when the torque required to agitate said material is greater than a predetermined value and the automatic reestablishment of said supply when said torque is less than said predetermined value.

16. The process of treating material consisting in processing it within a processing chamber, associating a temperature-changing medium with said chamber for varying the temperature of the material being processed and continuously controlling the plasticity of the material during the processing thereof by causing variations in the plasticity to effect the temperature-changing medium.

17. The process of treating a material consisting in positively forcing a continuous stream thereof and a fluid through a processing chamber, associating a temperature-changing medium with said chamber for varying the temperature of the material being processed, whipping the fluid into the material during its passage through said chamber, and automatically controlling the effect of the temperature-changing medium dependent upon the plasticity of the material.

18. The process of treating a material consisting in positively forcing a continuous stream thereof through a processing chamber, associating a temperature-changing medium with said chamber for varying the temperature of the material being processed, and automatically controlling the effect of the medium dependent upon the plasticity of the material.

19. The process of treating a material consisting in positively forcing a continuous stream of the material and a fluid through a processing chamber, controlling the quantity of fluid forced therein so as to obtain the desired ratio of material and fluid, associating a cooling medium with said chamber, automatically controlling the cooling medium by the degree of plasticity of the material in said chamber so that the material may be discharged from said chamber at a predetermined degree of plasticity and thereafter whipping the material in a whipping chamber free from the cooling medium to thoroughly mix together the greater and lesser hardened particles thereof.

20. The method of treating material to change its condition, which includes causing the material to flow in a comparatively thin confined layer over a heat-transfer surface and rapidly and mechanically agitating the material during such flow.

21. The method of refrigerating a material to effect rapid crystallization of at least a portion thereof which includes causing the material to flow in a comparatively thin confined layer over a heat transfer surface, subjecting said surface to the action of a refrigerating medium and rapidly and mechanically agitating the material during such flow.

22. A machine for processing material, comprising a temperature-changing chamber, means for associating a temperature-controlling medium therewith, means for positively forcing a continuous stream of material and fluid through said chamber, means for whipping said material and fluid together during their passage therethrough and an auxiliary whipping chamber connected with said temperature-changing chamber and disassociated from said temperature-controlling medium, and means for agitating the material in said whipping chamber.

23. A machine for processing material, comprising a temperature-changing chamber through which the material to be processed is adapted to pass continuously, a whipping chamber associated with said temperature changing chamber into which the processed material is discharged, and means for whipping the material therein in order to thoroughly mix particles of different temperatures with each other.

24. A machine for processing material, comprising a temperature-changing chamber, a whipping chamber, arranged so as not to substantially change the temperature of the material therein, and whipping blades in said chambers, the blades in said whipping chamber being adapted to whip the material therein at a greater speed than the blades in said temperature-changing chamber.

25. A machine for processing material, comprising a temperature-changing chamber, a whipping chamber of greater diameter than the temperature-changing chamber, a driving shaft extending through said chambers, means for driving said shaft, and whipping blades mounted thereon, the whipping blades in said whipping chamber extending a greater distance from said shaft than those in the temperature changing chamber, whereby they will travel at a greater speed.

26. A machine for processing material including a temperature-changing chamber, means for continuously passing a flow of material therethrough, means for associating a supply of temperature-changing medium with said temperature-changing chamber, a whipping chamber adapted to receive material from said processing chamber, and means within said whipping chamber for agitating said material substantially free of the effect of said temperature-changing medium.

27. A machine for processing material, comprising a temperature-changing chamber adapted to contain and vary the temperature of a quantity of material, means for continuously passing a supply of material therethrough and means for continuously maintaining a substantially constant degree of plasticity of said material, said means being actuated by the resistance to the processing of said material in said chamber.

28. A machine for processing material, comprising a temperature-changing chamber adapted to contain and vary the temperature of a quantity of material, apparatus for continuously passing a quantity of material therethrough, means actuated by the resisting condition of said material for maintaining the same at substantially a given degree of plasticity, and means for varying the action of said first-mentioned means and thereby varying the degree of plasticity of the processed material.

29. A machine for processing material, including a container, a rotary device adapted to move the contents thereof, a member adapted to be mechanically displaced by the resistance offered to the movement of said device by the contents of said container, and mechanism for utilizing said displacement to continuously control the said resistance.

30. In combination for use with a resisting medium, a movable element having its movement resisted thereby, and means mechanically operated by said element and adapted to continuously control the degree of resistance offered to the movement thereof by said resisting medium.

31. The combination with a container and a rotary device adapted to move the contents thereof, of a mechanism having a driving connection with said device, and means for continuously controlling the resistance offered to the movement of the rotary device by the contents of said container, said means being actuated by displacement of said driving connection due to said resistance.

32. In combination with a container and a rotary device adapted to move the contents thereof, a member mechanically connected with said device so as to be displaced in accordance with the resistance offered to the movement of the said device by the contents of said container, and means actuated by said member for continuously controlling said resistance.

33. A machine for processing material, comprising a temperature-changing chamber through which the material to be processed is adapted to pass continuously, means for associating a temperature-controlling medium therewith, and means for varying the effect of said medium upon the material within the chamber governed by the plasticity of the said material.

34. A machine for processing material including a processing chamber, means for associating a supply of temperature-changing medium therewith, means for continuously passing a supply of material to be processed therethrough, an agitator movable in said material under process, and a controller operable responsive to the resistance offered by said material to the movement of said agitator to stop the supply of said temperature-changing medium.

35. A machine for processing material, comprising a temperature changing chamber in which the material is processed, means for associating a temperature-changing medium therewith, and means actuated by the plasticity of the material in said chamber for continuously controlling the temperature-changing medium and thereby the plasticity of the material.

36. A machine for processing material, comprising a temperature-changing chamber, means for positively forcing a continuous stream of material and fluid therethrough, means for controlling the relative quantity of fluid and material, means for whipping the same in said chamber, means for associating a temperature controlling medium with said chamber for varying the temperature thereof, means controlled by the plasticity of said material for causing said medium to maintain the same at a substantially predetermined and constant plasticity, and a whipping chamber substantially disassociated from said medium into which the material is discharged so as to permit the particles thereof of different temperatures to be whipped together.

37. A machine for processing material, comprising a temperature-changing chamber adapted to contain a quantity of material, means for associating a temperature controlling medium with said chamber, a shaft rotatable in said chamber, whipping blades on said shaft, a valve for controlling the delivery of said medium, means for driving said shaft, and means for connecting said driving means to said valve and operable by the torque exerted thereon, whereby the change in torque due to the resistance to the rotation of said shaft exerted thereon by said material may be used to actuate said valve and thereby affect the temperature of said chamber.

38. A machine for processing material including a processing chamber, means for continuously passing a supply of material therethrough to be processed, an agitator movable within said material, means for driving said agitator including a member movable responsive to the resistance offered by said material to said agitation, and a controller operable responsive to the movement of said last mentioned member to control the physical condition of said material.

39. A machine for processing material including a processing chamber, means for continuously passing a supply of material to be processed therethrough, means for supplying a state-changing medium for changing the physical condition of the material under process, an agitator movable within said material under process, means for driving said agitator including an element movable responsive to the resistance to agitation offered by said material, and a controller operable responsive to the movement of said last mentioned member to control the supply of state-changing medium.

40. A machine for processing material including a processing chamber, means for continuously passing a supply of material to be processed therethrough, means for supplying a state-changing medium for changing the physical condition of the material under process, an agitator movable within said material under process, means for driving said agitator including an element movable responsive to the resistance to agitation offered by said material, and a controller operable responsive to the movement of said last-mentioned member to stop the supply of state-changing medium when said resistance has increased above a predetermined value.

41. A method of treating material, including the continuous passage of a stream of said material through a processing chamber, associating a medium therewith for changing the temperature and plasticity of the material, and automatically controlling the effective action of said medium responsive to the plasticity of the material in process.

42. A method of treating a liquid including the continuous passage of a stream of said liquid through a processing chamber, delivering a refrigerating liquid in heat interchanging relationship therewith to change the plasticity of the material, and automatically controlling the flow of one of said liquids responsive to the plasticity of the material in process.

43. A method of treating material, including the continuous passage of a stream of said material through a processing chamber, delivering a stream of refrigerating medium into heat interchanging relationship therewith, and automatically controlling the relative rates of flow of said streams responsive to the plasticity of the material in process.

44. A machine for processing material, including a tube, beating means in said tube including a central blade support forming therewith a substantially annular passage and whipping blades extending from said support substantially to the tube wall, means for effecting a relative rotation of said beating means and said tube, and means separate from said beating means for forcing said material through said passage and along said beating means at a rapid rate, and means for changing the temperature of said material during its flow to such an extent that it emerges in a plastic form.

45. A machine for processing material, including a tube, beating means in said tube including a central blade support forming therewith a substantially annular passage and whipping blades extending from said support substantially to the tube wall, means for effecting a relative rotation of said beating means and said tube, means for introducing a fluid to said passage, means separate from said beating means for forcing said material through said passage and along said beating means at a rapid rate, and means for changing the temperature of said material during its flow, whereby the ingredients of said material are effectively homogenized and the degree of fluidity decreased during the continuous flow through and delivery from said passage.

46. A machine for processing material, including a pair of concentric relatively rotatable walls spaced apart to leave a comparatively thin annular processing chamber, means for chilling one of said walls to a low temperature to effect refrigerating of the material being processed and a change in the plasticity thereof, blades on one of said walls extending into said annular space for agitating the material, and means independent of said blades for forcing the material lengthwise of said thin annular space at a rapid rate.

47. A machine for processing material, including a pair of relatively rotatable walls juxtaposed to form a thin processing passage therebetween, cutting means on one of said walls extending into said passage, means for applying refrigerant to one of said walls for reducing the temperature of the material below the crystallizing point of at least a portion of the material being processed, and means for forcing the material through said passage at a rapid rate in a direction at an angle to the direction of movement of said cutting means.

48. An apparatus for refrigerating a material, at least a portion of which is crystallizable, including a chamber for the material, means for chilling a surface of the chamber to a temperature below the crystallizing temperature of a portion, the ratio of the chilling surface of the receptacle measured in square inches, to the volume of the material in the receptacle exposed to the action of said surface, expressed in cubic inches, being not substantially less than 1 to 1, and means for causing the material to flow through said chamber along said surface.

49. An apparatus for refrigerating a material, at least a portion of which is crystallizable, including a chamber for the material, means for chilling a surface of the chamber to a temperature below the crystallizing temperature of a portion, the ratio of the chilling surface of the receptacle measured in square inches, to the volume of the material in the receptacle exposed to the action of said surface, expressed in cubic inches, being not substantially less than 1 to 1, and agitating means in said chamber relatively movable in respect to said surface, and along the latter.

50. An apparatus for processing material, including a container having a heat transferring wall, means for continuously passing the material along said wall, means whereby the material is subjected to the action of a temperature changing medium through said heat transferring wall to change the condition of said material, means for varying the effective action of said medium to maintain the plasticity of the processed material substantially constant and without substantial separation of the ingredients thereof, and whipping blades for agitating the material and rapidly cutting the same from said temperature changing surface at all portions of the latter in contact with said material.

51. The method of refrigerating a material to produce a homogeneous product free of segregated solids of appreciable size, which includes positively forcing the material to move in a comparatively thin layer over a heat transfer surface, subjecting said surface to the action of a refrigerating medium to effect rapid solidification of at least a portion of said material, and rapidly and mechanically removing from said surface, solids forming thereon.

52. A machine for refrigerating a material to effect rapid crystallization of at least a portion thereof, including a stationary heat transfer surface, means for refrigerating said surface, means for confining a comparatively thin layer of material adjacent to said surface, mechanism for positively forcing said material over said surface, and cutting means for removing from said surface solid material forming thereon during the passage of said material over said surface.

53. A machine for treating material to change its condition, including a heat transfer surface, means for confining a comparatively thin layer of material adjacent to said surface, means for causing said material to flow over said surface, and mechanism for rapidly and mechanically agitating the material during such flow.

In witness whereof, I have hereunto affixed my signature.

CLARENCE W. VOGT.

heat transfer surface, means for refrigerating said surface, means for confining a comparatively thin layer of material adjacent to said surface, mechanism for positively forcing said material over said surface, and cutting means for removing from said surface solid material forming thereon during the passage of said material over said surface.

53. A machine for treating material to change its condition, including a heat transfer surface, means for confining a comparatively thin layer of material adjacent to said surface, means for causing said material to flow over said surface, and mechanism for rapidly and mechanically agitating the material during such flow.

In witness whereof, I have hereunto affixed my signature.

CLARENCE W. VOGT.

DISCLAIMER 1,783,864.—*Clarence W. Vogt*, Louisville, Ky. APPARATUS AND PROCESS FOR TREATING MATERIALS. Patent dated December 2, 1930. Disclaimer filed December 28, 1936, by the assignee, *The Girdler Corporation*.

Hereby enters its disclaimer to the subject matter of claim 23 of said Letters Patent.

[*Official Gazette January 19, 1937.*]

DISCLAIMER 1,783,864.—*Clarence W. Vogt*, Louisville, Ky. APPARATUS AND PROCESS FOR TREATING MATERIALS. Patent dated December 2, 1930. Disclaimer filed February 20, 1940, by the assignee, *The Girdler Corporation*.

Hereby enters this disclaimer to claims 3 and 5 of said Letters Patent.

[*Official Gazette March 19, 1940.*]

DISCLAIMER 1,783,864.—*Clarence W. Vogt*, Louisville, Ky. APPARATUS AND PROCESS FOR TREATING MATERIALS. Patent dated December 2, 1930. Disclaimer filed December 28, 1936, by the assignee, *The Girdler Corporation*.

Hereby enters its disclaimer to the subject matter of claim 23 of said Letters Patent.

[*Official Gazette January 19, 1937.*]

DISCLAIMER 1,783,864.—*Clarence W. Vogt*, Louisville, Ky. APPARATUS AND PROCESS FOR TREATING MATERIALS. Patent dated December 2, 1930. Disclaimer filed February 20, 1940, by the assignee, *The Girdler Corporation*.

Hereby enters this disclaimer to claims 3 and 5 of said Letters Patent.

[*Official Gazette March 19, 1940.*]